United States Patent
Li et al.

(10) Patent No.: US 7,778,774 B2
(45) Date of Patent: Aug. 17, 2010

(54) PORTABLE TELEMATICS DEVICE

(75) Inventors: Wei-Min Li, Kaohsiung (TW);
Long-Tai Chen, Miaoli County (TW);
Li-Kung Huang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1046 days.

(21) Appl. No.: 11/485,280

(22) Filed: Jul. 13, 2006

(65) Prior Publication Data

US 2007/0150191 A1    Jun. 28, 2007

(30) Foreign Application Priority Data

Dec. 22, 2005    (TW) .............................. 94145784 A

(51) Int. Cl.
*H01B 11/00* (2006.01)
(52) U.S. Cl. ...................... 701/213; 709/205
(58) Field of Classification Search ............ 701/213, 701/33, 35, 66, 112, 437; 340/506; 455/456.1, 455/424; 709/205, 220
See application file for complete search history.

(56) References Cited

U.S. PATENT DOCUMENTS

| | | | |
|---|---|---|---|
| 6,202,008 B1 | 3/2001 | Beckert et al. | |
| 6,430,164 B1 * | 8/2002 | Jones et al. | 370/313 |
| 6,701,161 B1 | 3/2004 | Wendling | |
| 7,006,845 B2 | 2/2006 | Simon | |
| 7,215,950 B2 * | 5/2007 | Mazzara et al. | 455/418 |
| 7,457,693 B2 * | 11/2008 | Olsen et al. | 701/35 |

FOREIGN PATENT DOCUMENTS

| | | |
|---|---|---|
| JP | 2001-004387 A | 12/2001 |
| TW | 432833 A | 5/2001 |

* cited by examiner

*Primary Examiner*—Dalena Tran
(74) *Attorney, Agent, or Firm*—Birch, Stewart, Kolasch & Birch, LLP

(57) ABSTRACT

An automobile navigation system with portable telematics device is disclosed, which comprises: a first telematics device, being arranged fixedly inside an automobile; a detachable second telematics device, capable of being coupled to the first telematics device by a specific control data bus; wherein, the resources of software/hardware of the second telematics device are accessible to the first telematics device while the second telematics device is connected to the first telematics device; and the second telematics device is capable of working independently and thus being used by a user as a personal data assistant while the second telematics device is detached from the first telematics device.

26 Claims, 2 Drawing Sheets

PORTABLE TELEMATICS DEVICE

FIELD OF THE INVENTION

The present invention relates to a portable telematics device, and more particularly, to an automobile navigation system capable of connecting to a portable telematics device by a specific control data bus for enabling the automobile navigation system to have access to the software/hardware of the portable telematics device.

BACKGROUND OF THE INVENTION

The Global Positioning System (GPS) is a worldwide radio-navigation system formed from a constellation of 24 satellites and their ground stations. As the fast advance of the GPS technology, GPS receivers have been miniaturized to just a few integrated circuits and so are becoming very economical and compact, that makes the technology accessible to virtually everyone and almost anywhere. Nowadays, GPS technology has matured into a resource that goes far beyond being used in an navigation system stationed in an automobile, but is finding its way into handheld satellite navigation devices, such as a portable GPS satellite unit, a personal digital assistant (PDA) with built-in GPS module, or a PDA connected externally to a GPS module, etc. However, all those handheld satellite navigation devices currently available are only PDAs with additional GPS function, that are achieved by connecting a GPS module to a PDA through either a RS-232 transmission line or an universal serial bus (USB). The aforesaid method of connecting GPS modules to PDAs not only can not integrate functions of the two devices, but also can not make good use of the software/hardware resources of the two.

As a conventional automobile navigation system disclosed in TW Pat. No. 00432833, the navigation data received by a satellite navigation system stationed in a vehicle is transmitted to a portable device so that a user carrying the portable device can use the navigation data stored therein for guidance while leaving the automobile. However, as the aforesaid data transmission is accomplished either by a wired means or a wireless means, it is obvious that the means of connecting the automobile satellite navigation system and the portable device not only can not integrate functions of the two devices, but also can not make good use of the software/hardware resources of the portable device.

Therefore, it is in need of an automobile navigation system with portable telematics device, which utilizes a specific control data bus capable of supporting multiple data transmission protocols to connect and integrate a portable telematics device with the automobile navigation system and so not only the cost of the automobile navigation system is reduced, but also the software/hardware resources of the portable device can be fully utilized while being detached or connected to the automobile navigation system.

SUMMARY OF THE INVENTION

The primary object of the present invention is to provide an automobile navigation system with portable telematics device, which utilizes a specific control data bus to connect and integrate a portable telematics device with the automobile navigation system and so not only the cost of the automobile navigation system is reduced, but also the software/hardware resources of the portable device can be fully utilized.

It is another object of the invention to provide a portable telematics device capable of operating independently of an automobile navigation system stationed in an automobile for enabling a user to have access to the built-in functions of the portable telematics device even as the user is not sitting inside the automobile.

Further another object of the invention is to provide a specific control data bus for connecting and integrating a portable telematics device with another telematics device stationed inside an automobile so as to enable the two telematics devices to transmit/receive electronic signals independent of each other while exchanging data therebetween.

Yet another object of the invention is to provide an automobile navigation system with portable telematics device, which is used for enabling a user to have access to functions such as satellite navigation, digital video/audio entertainment and wireless hand-free communication while the user is stationed inside an automobile, and for enabling the user to have access to functions of personal data management, e-map inquiry and wireless networking while the user is not sitting inside the automobile.

One another object of the invention is to enable a user to have access to any data required while viewing the acquired data on a specific display, no matter he/she is or is not sitting inside an automobile, without the need to install other displays in the automobile.

To achieve the above objects, the present invention provides an automobile navigation system with portable telematics device, comprising: a first telematics device, being arranged fixedly inside an automobile; and a detachable second telematics device, capable of maintaining connection to the first telematics device through a specific control data bus while it is detached from the first telematics device; wherein, the two telematics devices are enabled to receive electronic signals transmitted from another through the specific control data bus for exchanging and updating data stored in the two devices while the detachable second telematics device is connected to the first telematics device.

Preferably, the first telematics device further comprises a GPS unit, being used for receiving satellite positioning signals, and the second telematics device also comprises another GPS unit for receiving satellite positioning signals.

Preferably, the control data bus is defined to support multiplexing communication for enabling a plurality of peripheral units to access data therethrough.

Preferably, the control data bus is defined to support audio/video (AV) data transmission, and also is defined to support multiple data transmission protocols, such as Inter-Integrated Circuit (I2C), Universal Asynchronous Receiver/Transmitter (UART), and General Purpose Input/Outputs (GPIOs), etc.

Moreover, to achieve the above objects, the present invention further provides another automobile navigation system with portable telematics device, comprising: a first telematics device, being arranged fixedly inside an automobile, having a GPS unit arranged therein for receiving satellite positioning signals and recording navigation data of the automobile; and a detachable second telematics device, having a display for displaying navigation data stored in the first telematics device, capable of maintaining connection to the first telematics device through a specific control data bus while it is detached from the first telematics device; wherein, the two telematics devices are enabled to receive electronic signals transmitted from another through the specific control data bus for exchanging and updating data stored in the two devices while the detachable second telematics device is connected to the first telematics device.

Preferably, the control data bus is defined to support multiplexing communication for enabling a plurality of peripheral units to access data therethrough.

Preferably, the control data bus is defined to support audio/video (AV) data transmission, or is defined to support multiple data transmission protocols, such as Inter-Integrated Circuit (I2C), Universal Asynchronous Receiver/Transmitter (UART), and General Purpose Input/Outputs (GPIOs), etc.

Preferably, the first telematics device further comprises: a micro processing unit, a digital video broadcasting (DVB) unit, a power unit and an audio output unit.

Preferably, the second telematics device further comprises: a micro processing unit, a memory unit, a data storage unit, a switch, a bluetooth unit, a wireless local area network (WLAN) unit, a power unit and an audio output unit.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
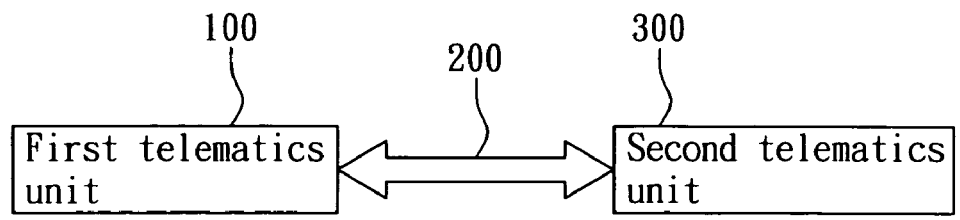
FIG. 1 is a schematic diagram depicting the communication between a first telematics device and a second telematics device of an automobile navigation system according to a preferred embodiment of the present invention.

Please refer to FIG. 1, which is a schematic diagram depicting the communication between a first telematics device and a second telematics device of an automobile navigation system according to a preferred embodiment of the present invention. As seen in FIG. 1, a first telematics device 100 is connected to a second telematics device 300 through a control data bus 200, whereas the first telematics device 100 is an immovable device, being fixedly arranged inside an automobile, while the second telematics device 300 is a portable device, capable of maintaining connection to the first telematics device 100 through the control data bus 200 while it is detached from the first telematics device 100.

When the first telematics device 100 is connected to the second telematics device, the two telematics devices are enabled to receive electronic signals transmitted from another through the control data bus 200 for exchanging and updating data stored in the two devices. In a preferred aspect, the control data bus 200 not only can be defined to support multiplexing communication for enabling a plurality of peripheral units to access data therethrough, but also can be defined to support audio/video (AV) data transmission, or can be defined to support multiple data transmission protocols, such as Inter-Integrated Circuit (I2C), Universal Asynchronous Receiver/Transmitter (UART), and General Purpose Input/Outputs (GPIOs), etc.

Figure 2:
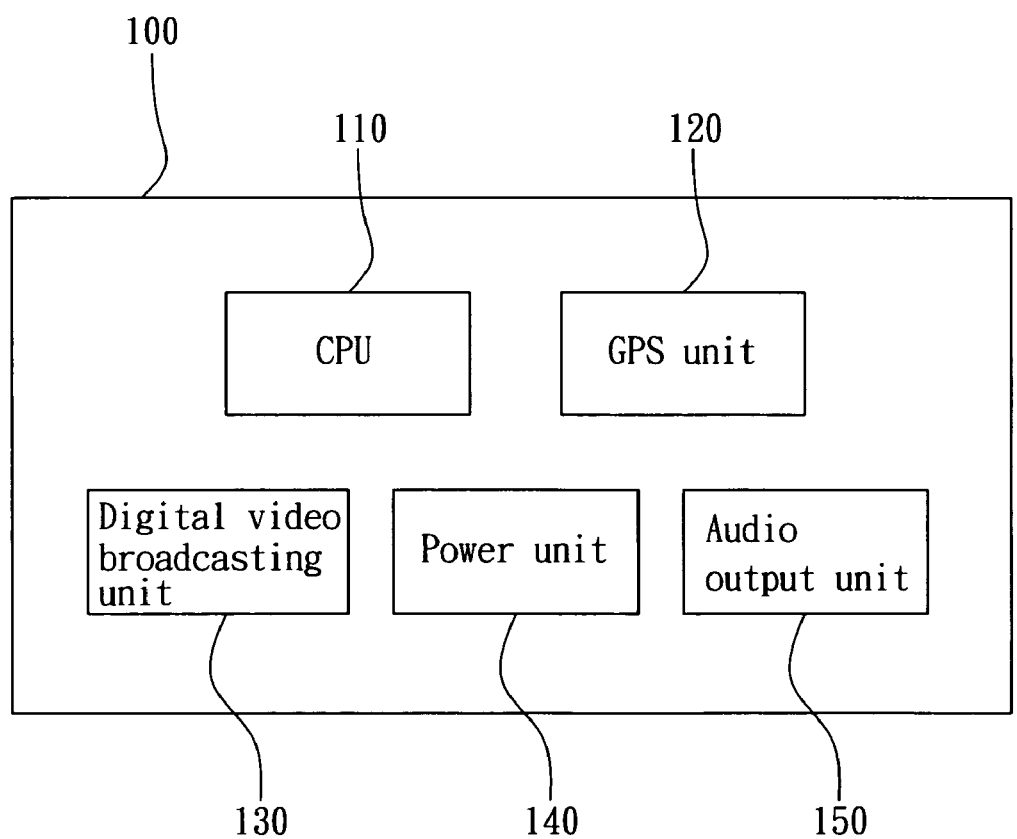
FIG. 2 is a block diagram illustrating an immovable first telematics device of the invention.

Please refer to FIG. 2, which is a block diagram illustrating an immovable first telematics device of the invention. As seen in FIG. 2, the first telematics device 100 further comprises: a micro processing unit 110, a GPS unit 120, a DVB unit 130, a power unit 140 and an audio output unit 150. Wherein, the micro processing unit 110 is used for rationalizing the operation processes of a variety of signals and so is able to support the signal networking and processing in the automobile. As more and more micro electronic devices are required to be fitted into automobiles, conventional circuit layout will demand more and more space of the automobiles. Therefore, the micro processing unit 110 is enabled to support the controller area network (CAN) technique so that it is enabled to process the signal linkage between electronic devices fitted inside an automobile. The GPS unit 120 is used for receiving satellite positioning signals and recording navigation data of the automobile. In addition, By cooperating the GPS unit with additional inertial sensing module and magnetic sensing module, such as a gyroscope, or an electronic compass, etc., a dead reckoning method can be executed so as to provide a much more accurate navigation data. The DVB unit 130 is used for providing digital audio/video entertainment, by which a user can listen to music or broadcast program while sitting, in an automobile. The power unit 140 is used for providing power to the first telematics device 100. It is noted that the power unit 140 also can provide power to the second telematics device 300 when the second telematics device 300 is connected to the first telematics device 100. In a preferred aspect, the power unit 130 is equipped with power protection and management abilities. The audio output unit 150 is connected to automobile speakers through a built-in connector and thus is capable of outputting all kinds of music and audio effects.

Figure 3:
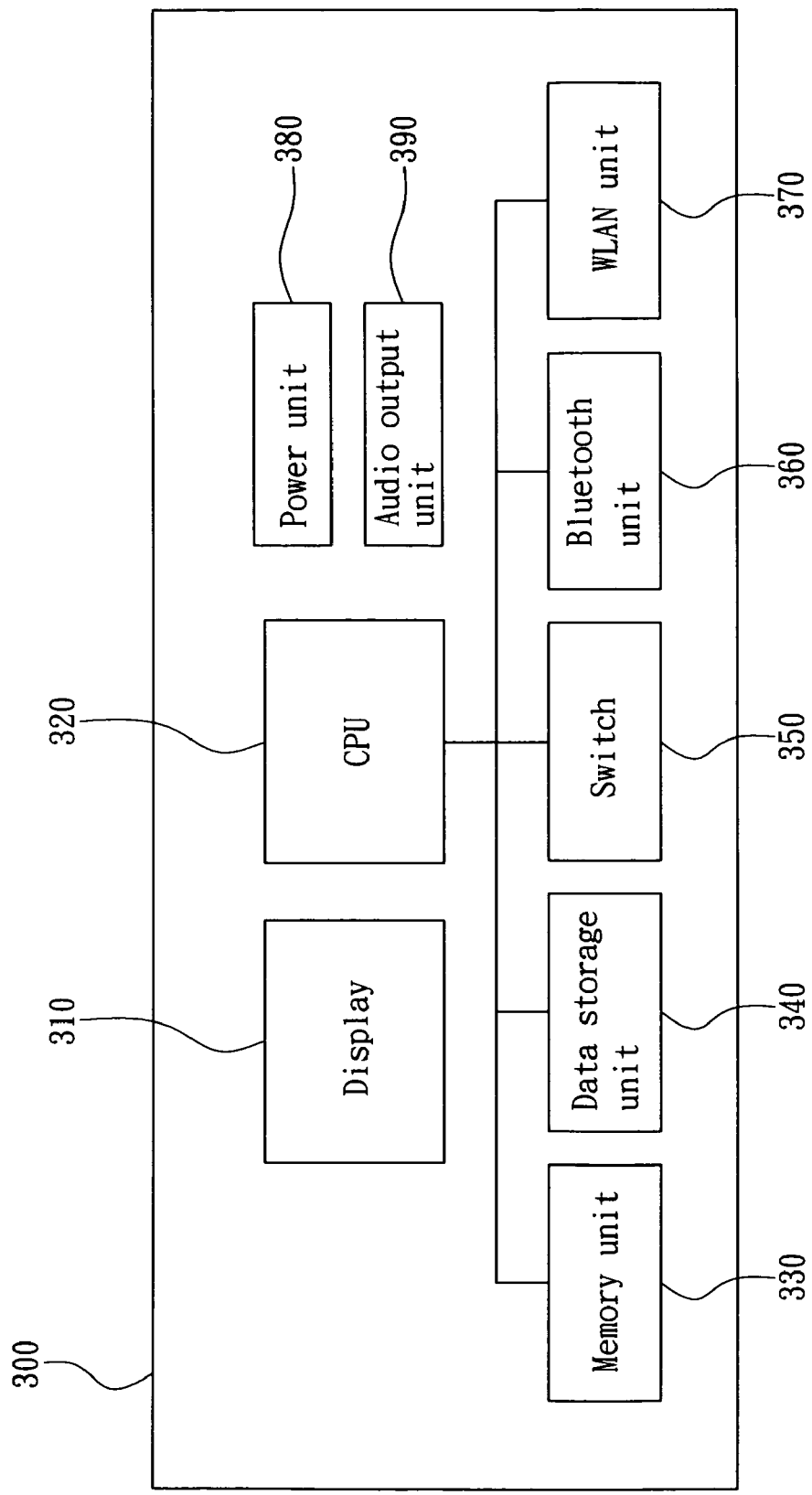
FIG. 3 is a block diagram illustrating a portable second telematics device of the invention.

Please refer to FIG. 3, which is a block diagram illustrating a portable second telematics device of the invention. As seen in FIG. 3, the second telematics device 300 is comprised of: a display 310, a micro processing unit 320, a memory unit 330, a data storage unit 340, a switch 350, a bluetooth unit 360, a wireless local area network (WLAN) unit 370, a power unit 380 and an audio output unit 390.

Wherein, the display 310 can be a liquid crystal panel that is used as the monitor of the second telematics device 300 while the second telematics device 300 is detached from the first telematics device 100, and is used as the monitor of the whole automobile navigation system for displaying navigation data recorded in the first telematics device 100 while the second telematics device 300 is connected to the first telematics device 100. The memory unit 330 can be a Synchronous Dynamic Random Access Memory (SDRAM), that it is enabled to work with the micro processing unit 320 for enabling the second telematics device 300 to perform a signal processing operation independently while the second telematics device 300 is detached from the first telematics device 100, so that the processes embedded in the memory unit 330, such as an operation system and program management, can be executed by the micro processing unit 320. The data storage unit 340 is used for storing data, which can be connected to an external storage unit through a connecting port for enabling an user using the external storage unit to access and update the system application program, navigation data, and so on. The switch 350 is used to select a control mode from a plurality of control modes to be displayed on the display 310, whereas the control modes can be configured as various graphical control interfaces, such as a multimedia controlling interface, or a navigation map, and so on. The bluetooth unit 360 is used for enabling the second telematics device 300 to have wireless hand-free and short-range data transmission abilities, by which the second telematics device 300 is able to communicate with other electronic devices for data transmission. The WLAN unit 370 is used for enabling the second telematics device 300 to have networking ability, by which the second telematics device 300 is able to upload/ download data to/from a network. The power unit 380 is substantially an independent power source for provide power to the second telematics device 300 while the second telematics device 300 is detached from the first telematics device 100. The audio output unit 390 is substantially an independent audio output of the second telematics device 300 while the second telematics device 300 is detached from the first telematics device 100.

To sum up, the present invention provides an automobile navigation system with portable telematics device, which utilizes a specific control data bus capable of supporting multiple data transmission protocols to connect and integrate a portable telematics device with the automobile navigation system and so not only the cost of the automobile navigation system is reduced, but also the software/hardware resources of the portable device can be fully utilized not matter the portable telematics device is detached or connected to the automobile navigation system. It is noted that, as the portable telematics device is connected to the automobile navigation system, the portable telematics device is integrated to the automobile navigation system for enabling the automobile navigation system to have access to those additional functions embedded in the portable telematics device, and as the portable telematics device is detached from the automobile navigation system, the portable telematics device is capable of working independently and thus being used by a user as a personal data assistant (PDA).

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automobile navigation system with portable telematics device, comprising:
    a first telematics device, being arranged fixedly inside an automobile; and
    a detachable second telematics device, capable of maintaining connection to the first telematics device through a specific control data bus while it is detached from the first telematics device;
    wherein, the two telematics devices are enabled to receive electronic signals transmitted from each other through the specific control data bus for exchanging and updating data stored in the two devices while the detachable second telematics device is connected to the first telematics device.

2. The automobile navigation system with portable telematics device of claim 1, wherein the first telematics device further comprises a GPS unit, being used for receiving satellite positioning signals.

3. The automobile navigation system with portable telematics device of claim 1, wherein the second telematics device further comprises a GPS unit for receiving satellite positioning signals.

4. The automobile navigation system with portable telematics device of claim 1, wherein the control data bus is defined to support multiplexing communication for enabling a plurality of peripheral units to access data therethrough.

5. The automobile navigation system with portable telematics device of claim 1, wherein the control data bus is defined to support audio/video (AV) data transmission.

6. The automobile navigation system with portable telematics device of claim 1, wherein the control data bus is defined to support data transmission protocol of Inter-Integrated Circuit (I2C).

7. The automobile navigation system with portable telematics device of claim 1, wherein the control data bus is defined to support data transmission protocol of Universal Asynchronous Receiver/Transmitter (UART).

8. The automobile navigation system with portable telematics device of claim 1, wherein the control data bus is defined to support data transmission protocol of General Purpose Input/Outputs (GPIOs).

9. An automobile navigation system with portable telematics device, comprising:
    a first telematics device, being arranged fixedly inside an automobile, having a GPS unit arranged therein for receiving satellite positioning signals and recording navigation data of the automobile; and
    a detachable second telematics device, having a display for displaying navigation data stored in the first telematics device, capable of maintaining connection to the first telematics device through a specific control data bus while it is detached from the first telematics device;
    wherein, the two telematics devices are enabled to receive electronic signals transmitted from each other through the specific control data bus for exchanging and updating data stored in the two devices while the detachable second telematics device is connected to the first telematics device.

10. The automobile navigation system with portable telematics device of claim 9, wherein the control data bus is defined to support multiplexing communication for enabling a plurality of peripheral units to access data therethrough.

11. The automobile navigation system with portable telematics device of claim 9, wherein the control data bus is defined to support audio/video (AV) data transmission.

12. The automobile navigation system with portable telematics device of claim 9, wherein the control data bus is defined to support data transmission protocol of Inter-Integrated Circuit (I2C).

13. The automobile navigation system with portable telematics device of claim 9, wherein the control data bus is defined to support data transmission protocol of Universal Asynchronous Receiver/Transmitter (UART).

14. The automobile navigation system with portable telematics device of claim 9, wherein the control data bus is defined to support data transmission protocol of General Purpose Input/Outputs (GPIOs).

15. The automobile navigation system with portable telematics device of claim 9, wherein the first telematics device further comprises a micro processing unit.

16. The automobile navigation system with portable telematics device of claim 9, wherein the first telematics device further comprises a digital video broadcasting unit.

17. The automobile navigation system with portable telematics device of claim 9, wherein the first telematics device further comprises a power unit.

18. The automobile navigation system with portable telematics device of claim 9, wherein the first telematics device further comprises an audio output unit.

19. The automobile navigation system with portable telematics device of claim 9, wherein the second telematics device further comprises a micro processing unit.

20. The automobile navigation system with portable telematics device of claim 9, wherein the second telematics device further comprises a memory unit.

21. The automobile navigation system with portable telematics device of claim 9, wherein the second telematics device further comprises a data storage unit.

22. The automobile navigation system with portable telematics device of claim 9, wherein the second telematics device further comprises a switch.

23. The automobile navigation system with portable telematics device of claim 9, wherein the second telematics device further comprises a bluetooth unit.

24. The automobile navigation system with portable telematics device of claim 9, wherein the second telematics device further comprises a wireless local area network unit.

25. The automobile navigation system with portable telematics device of claim 9, wherein the second telematics device further comprises a power unit for providing power to the second telematics device while it is detached from the first telematics device.

26. The automobile navigation system with portable telematics device of claim 9, wherein the second telematics device further comprises an audio output unit for providing an independent audio output to the second telematics device while it is detached from the first telematics device.

* * * * *